United States Patent
Havi et al.

(10) Patent No.: US 9,890,056 B2
(45) Date of Patent: Feb. 13, 2018

(54) MODULAR WATER PROVISION SYSTEM FOR RURAL HOUSING

(71) Applicant: Mikhol Sahar Ltd., Jerusalem (IL)

(72) Inventors: Moshe Havi, Jerusalem (IL); Shalom Shay Hawai, Jerusalem (IL)

(73) Assignee: Mikhol Sahar Ltd., Jerusalem (IL)

( * ) Notice: Subject to any disclaimer, the term of this patent is extended or adjusted under 35 U.S.C. 154(b) by 0 days.

(21) Appl. No.: 15/588,736

(22) Filed: May 8, 2017

(65) Prior Publication Data

US 2017/0327385 A1   Nov. 16, 2017

Related U.S. Application Data

(60) Provisional application No. 62/334,467, filed on May 11, 2016.

(51) Int. Cl.
    *C02F 1/00* (2006.01)
    *C02F 1/28* (2006.01)
    *C02F 1/32* (2006.01)

(52) U.S. Cl.
    CPC .............. *C02F 1/004* (2013.01); *C02F 1/283* (2013.01); *C02F 1/32* (2013.01); *C02F 2201/007* (2013.01); *C02F 2201/008* (2013.01); *C02F 2201/009* (2013.01); *C02F 2303/04* (2013.01)

(58) Field of Classification Search
    None
    See application file for complete search history.

(56) References Cited

U.S. PATENT DOCUMENTS

| | | | | |
|---|---|---|---|---|
| 5,240,043 A * | 8/1993 | Campbell | ............. | B67D 7/002 137/211 |
| 5,803,139 A * | 9/1998 | Kennedy | ............. | C02F 1/78 141/231 |
| 6,089,420 A * | 7/2000 | Rodriguez | ............. | B67D 1/0004 141/18 |
| 6,200,473 B1 * | 3/2001 | Fahey | ............. | B01F 5/106 137/899 |
| 6,248,242 B1 * | 6/2001 | Martin | ............. | C02F 1/78 141/1 |
| 7,514,815 B2 * | 4/2009 | Paik | ............. | H02J 3/14 307/64 |
| 8,388,850 B2 * | 3/2013 | Delano | ............. | C02F 9/00 210/198.1 |

(Continued)

OTHER PUBLICATIONS

Written Opinion of the International Searching Authority, dated Jul. 9, 2017 (ISA Israel Patent Office).

*Primary Examiner* — Chester T Barry
(74) *Attorney, Agent, or Firm* — Eva Leah Taksel

(57) ABSTRACT

The present invention provides a transportable system is provided for locally providing hundreds of liters of water to a household, the system including a trailer carrier, adapted to be connected to a private car or vehicle, a water container in fluid connection with a filling apparatus and with a delivery apparatus, the filling apparatus comprising a filling conduit and a filing pump, a water filter apparatus, the delivery apparatus including a delivery conduit and a delivery pump, a portable electricity generator and an inverter, wherein the trailer carrier is adapted to carry the water container and water therein, the filling apparatus, the water filter apparatus, the delivery apparatus, the portable electricity generator and the inverter.

12 Claims, 3 Drawing Sheets

(56) References Cited

U.S. PATENT DOCUMENTS

| | | | | |
|---|---|---|---|---|
| 8,723,344 | B1* | 5/2014 | Dierickx | F03G 7/08 |
| | | | | 290/1 R |
| 9,592,102 | B2* | 3/2017 | Knight | A61C 1/0076 |
| 2003/0132104 | A1* | 7/2003 | Yamashita | C02F 9/00 |
| | | | | 204/252 |
| 2004/0154878 | A1* | 8/2004 | Navarro | B60T 7/16 |
| | | | | 188/1.11 E |
| 2005/0056435 | A1* | 3/2005 | Price | A62C 27/00 |
| | | | | 169/52 |
| 2006/0064929 | A1* | 3/2006 | Allen | A01G 29/00 |
| | | | | 47/48.5 |
| 2006/0226669 | A1* | 10/2006 | Tong | B60P 3/32 |
| | | | | 296/24.3 |
| 2008/0083683 | A1* | 4/2008 | Apps | A47B 3/006 |
| | | | | 211/74 |
| 2008/0087305 | A1* | 4/2008 | Cotter | B08B 17/00 |
| | | | | 134/42 |
| 2011/0089123 | A1* | 4/2011 | Kennedy | C02F 1/001 |
| | | | | 210/808 |
| 2011/0266203 | A1* | 11/2011 | Frisky | C02F 9/00 |
| | | | | 210/205 |
| 2013/0026108 | A1* | 1/2013 | Yager | C02F 1/36 |
| | | | | 210/748.04 |
| 2013/0098816 | A1* | 4/2013 | Elfstrom | C02F 1/00 |
| | | | | 210/153 |
| 2013/0252213 | A1* | 9/2013 | Gridley | G09B 19/00 |
| | | | | 434/226 |
| 2015/0059330 | A1* | 3/2015 | Thirunavukarasu | E01C 19/17 |
| | | | | 60/430 |
| 2016/0170419 | A1* | 6/2016 | Kevin | G01N 33/18 |
| | | | | 137/88 |

\* cited by examiner

MODULAR WATER PROVISION SYSTEM FOR RURAL HOUSING

FIELD OF THE INVENTION

The present invention relates generally to water transportation systems, and more specifically to apparatus for provision of potable water to populations housed in rural settings.

BACKGROUND OF THE INVENTION

Many developing countries suffer from dry seasons and/or poor water provision systems for housing. In many countries, the populations still rely upon people carrying water to their houses/tents. Often, there is no infrastructure of pipes and mains water supply. The local inhabitants may obtain water from a local river, pond or reservoir, by use of buckets, barrels and other water containers. These people can only carry a certain amount of water to their houses/tents. This limits their ability to wash themselves and their clothes, and further limits the hygienic use of food and beverages. There thus remains an unmet need to provide each family with hundreds of liters of water on a daily basis. Additionally, there is an unmet need for systems which can maneuver dirt tracked and untarmacked road to reach the residences of the local populations.

SUMMARY OF THE INVENTION

It is an object of some aspects of the present invention to provide an apparatus for provision of potable water to populations housed in rural settings In some embodiments of the present invention, improved methods and systems are provided for mobilization of an apparatus for provision of potable water to populations, typically housed in rural settings.

In other embodiments of the present invention, a transportable system is provided for locally providing hundreds of liters of water to a household, the system comprising:
  a) a trailer carrier, adapted to be connected (typically by a hook connector or standard tow hook) to a private car or vehicle;
  b) a water container in fluid connection with a filling apparatus and with a delivery apparatus;
  c) the filling apparatus comprising a filling conduit with a graded pick-up strainer and a filling pump;
  d) a water filter apparatus comprising a micronic and carbon filter system, coupled to an ultraviolet (UV) delivery purifier;
  e) the delivery apparatus comprising a delivery conduit and a delivery pump;
  f) a portable electricity generator, an un-interruptible power supply (UPS) and an inverter;
  wherein the trailer carrier is adapted to carry the water container and water therein, the filling apparatus, the water filter apparatus, the delivery apparatus, the portable electricity generator and the inverter.

The trailer system of the present invention is adapted to provide water whether local electricity and water supplies are available or not. Moreover, the trailer systems of the present invention are configured to provide sufficient potable water where none of electricity supplies, roads and potable water infrastructures is present.

There is thus provided according to an embodiment of the present invention, a transportable modular water provision system for locally providing hundreds of liters of water to at least one household, the system including;
  a) a trailer carrier, adapted to be connected to a private car or vehicle;
  b) a filling apparatus including a filling conduit and a filling pump;
  c) a water filter apparatus comprising a micronic and carbon filter system, coupled to an ultraviolet (UV) delivery purifier;
  d) a delivery apparatus including a delivery conduit and a delivery pump;
  e) a water container in fluid connection with said filling apparatus and with said delivery apparatus;
  f) a portable electricity generator, an un-interruptible power supply (UPS) and an inverter;
  wherein said trailer carrier is adapted to carry said water container and water therein, said filling apparatus, said water filter apparatus, said delivery apparatus, said portable electricity generator and said optional inverter.

Additionally, according to an embodiment of the present invention, the trailer carrier, further includes;
  i. at least one side jack;
  ii. at least two double-wheeled axes; and
  iii. at least one front jack.

Moreover, according to an embodiment of the present invention, the filling apparatus is in fluid connection with the water filter apparatus and wherein the filling pump is adapted to transfer water from a water reservoir via the delivery conduit through the water filter apparatus to the water container.

Additionally, according to an embodiment of the present invention, the water container is a generally cylindrical tank.

Furthermore, according to an embodiment of the present invention, the generally cylindrical tank is made of fiberglass.

Further, according to an embodiment of the present invention, the tank further includes a breather and an inspection window.

Additionally, according to an embodiment of the present invention, the tank further includes manual taps in fluid connection therewith.

Furthermore, according to an embodiment of the present invention, the system is adapted to provide filtered water to the at least one household via the filling apparatus.

Further, according to an embodiment of the present invention, at least one of the filling pump and the delivery pump receive electrical energy from the portable electricity generator.

Further, according to an embodiment of the present invention, at least one of the filling pump and the delivery pump receive electrical energy from the UPS.

Additionally, according to an embodiment of the present invention, at least one of the filling pump and the delivery pump receive electrical energy from the inverter, the inverter receiving electrical energy from the portable electricity generator.

Moreover, according to an embodiment of the present invention, the transportable modular water provision system further includes a cable reel and electrical cable. According to some embodiments, the cable is for an external electrical connection from an external source of electricity.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified pictorial illustration showing a modular system for water provision, in accordance with an embodiment of the present invention;

FIG. 2 is another simplified pictorial illustration showing a modular system for water provision, in accordance with an embodiment of the present invention; and FIG. 3 is a simplified flow chart of a power provision apparatus within the modular system of FIG. 1, in accordance with an embodiment of the present invention.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

Figure 1:
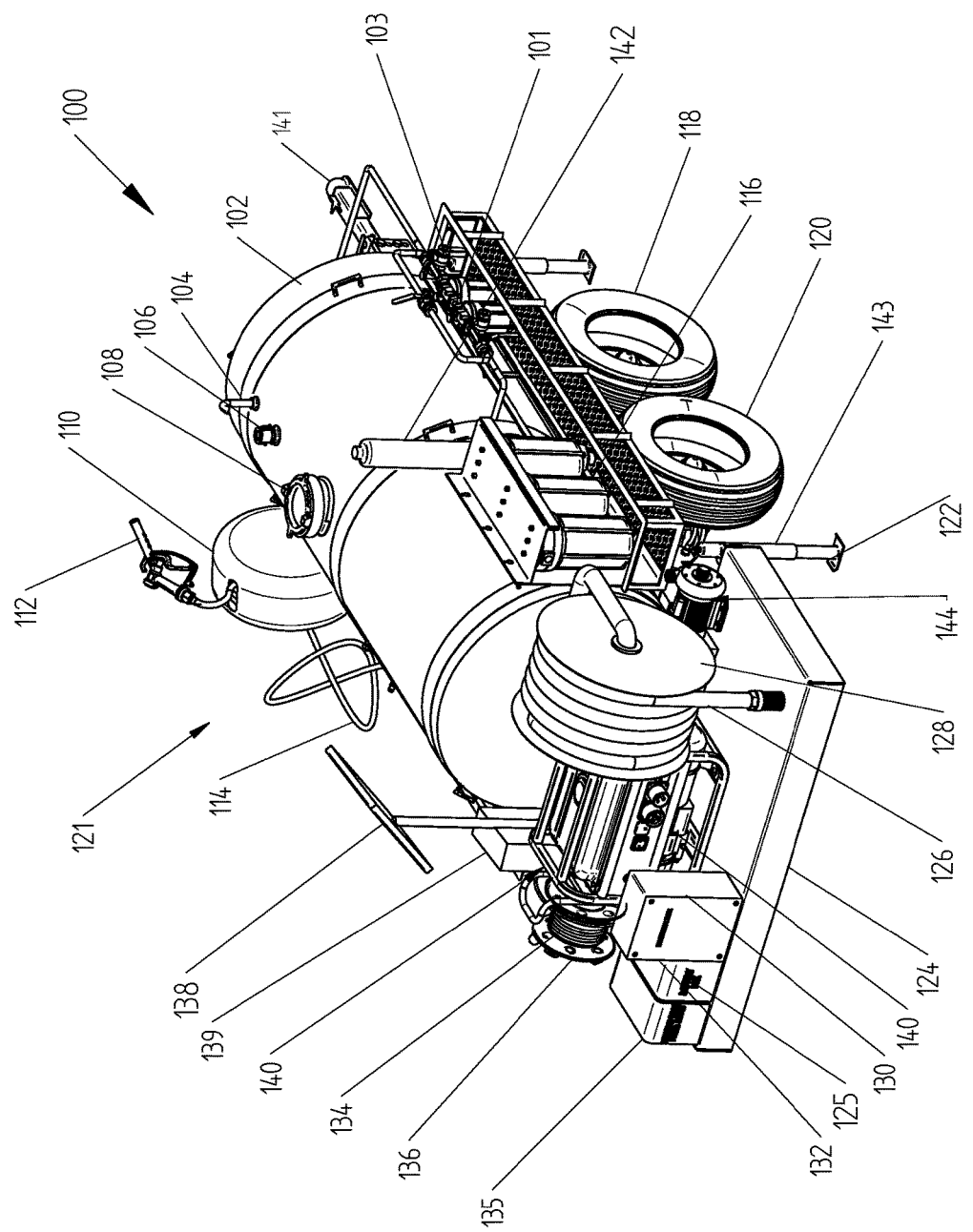

Reference is now made to FIG. 1, which is a simplified pictorial illustration showing a modular system 100 for water provision, in accordance with an embodiment of the present invention.

The system for water provision acts as a transportable system, adapted to provide hundreds to thousands of liters of water to a household or to many households, the system comprising:

a) a trailer carrier 101, adapted to be connected (typically by a hook connector) to a private car or vehicle (not shown);
b) a water container (also called a tank) 102 in fluid connection with a filling apparatus (220 FIG. 2) and with a delivery apparatus 121;
c) the filling apparatus comprising a filling conduit 126 and a filing pump 122;
d) an input water filter apparatus 116;
e) the delivery apparatus comprising a delivery conduit 110 and a delivery pump 206 (FIG. 2);
f) a portable electricity generator 130 and an inverter 132; according to some embodiments the batteries are constructed and configured to be charged by solar electricity;
g) a solar panel 138 for battery charging (batteries 125, FIG. 3) and a solar panel control unit 139 and a generator set 140;
h) a universal towing attachment 141 to enable towing of the system by any vehicle or car;
i) an outlet water filter 103 and an ultraviolet online (UV) purifier 142;
j) a stabilizing jack 143, at four points on the chassis (carrier 101);
k) a self-priming pump 144 for filling the tank;
l) an uninterruptable power supply (UPS) 135,
 wherein the trailer carrier is adapted to carry the water container and water therein, the filling apparatus, the water filter apparatus, the delivery apparatus, the portable electricity generator and the inverter.

Inverter 132 is constructed and configured to supply the pumps 144, 206, at all times. According to some embodiments, they have a single phase input and an additional 3 phase output thereby making the use of cheap and readily available industrial pumps possible.

In the event of the generator set 140 being out of action, the UPS 135 provides short term current as the solar charger which will have been constantly charging the batteries (125, FIG. 3) to ensure they are available.

There is a solar charger comprising solar panel 138 and generator set 140, on the carrier 101 which continuously charges all the batteries.

When the generator is running it is configured to charge all the batteries.

The particle and microbial filter system (called water filter apparatus 116 herein) are in the water delivery line before the UV purifier 142.

Carrier 101 is intentionally of a narrow width (less than 1.4 m, preferably less than 1.2 m, more preferably less than 1.0 m) so as to enable access to any area and is intended to be pulled by a standard tow hook (such as universal towing attachment 141).

Additionally, according to an embodiment of the present invention, the trailer carrier, further includes;
 i. a jack disposed at each corner 122, 240 (4 jacks); and
 ii. at least two double-wheeled axes 210 (FIG. 2) with wheels 118.

Moreover, according to an embodiment of the present invention, the filling apparatus is in fluid connection with the water filter apparatus and wherein the filling pump is adapted to transfer water from a water reservoir via the delivery conduit through the water filter apparatus to the water container.

Additionally, according to an embodiment of the present invention, the water container is a generally cylindrical tank.

Furthermore, according to an embodiment of the present invention, the generally cylindrical tank is made of fiberglass.

Further, according to an embodiment of the present invention, the tank further includes a breather 104 and an inspection window 108 and a filling entry port 106.

Additionally, according to an embodiment of the present invention, the tank further includes manual taps 245 (FIG. 2) in fluid connection therewith. The manual taps are configured to deliver from the UV filter or bypass the UV filter by adjusting the taps accordingly.

Furthermore, according to an embodiment of the present invention, the system is adapted to provide filtered water to the at least one household via the filling apparatus.

Further, according to an embodiment of the present invention, at least one of the filling pump and the delivery pump receive electrical energy from the portable electricity generator.

Additionally, according to an embodiment of the present invention, at least one of the filling pump and the delivery pump receive electrical energy from the inverter, the inverter receiving electrical energy from the portable electricity generator.

Moreover, according to an embodiment of the present invention, the transportable modular water provision system further includes a cable reel 134 and electrical cable 136, which may be up to ten, twenty, thirty, forty, fifty, sixty, seventy, eighty, ninety, 100, 200, 300 or 400 meters long. According to some embodiments, the cable is for an external electrical connection from an external source of electricity.

Figure 2:
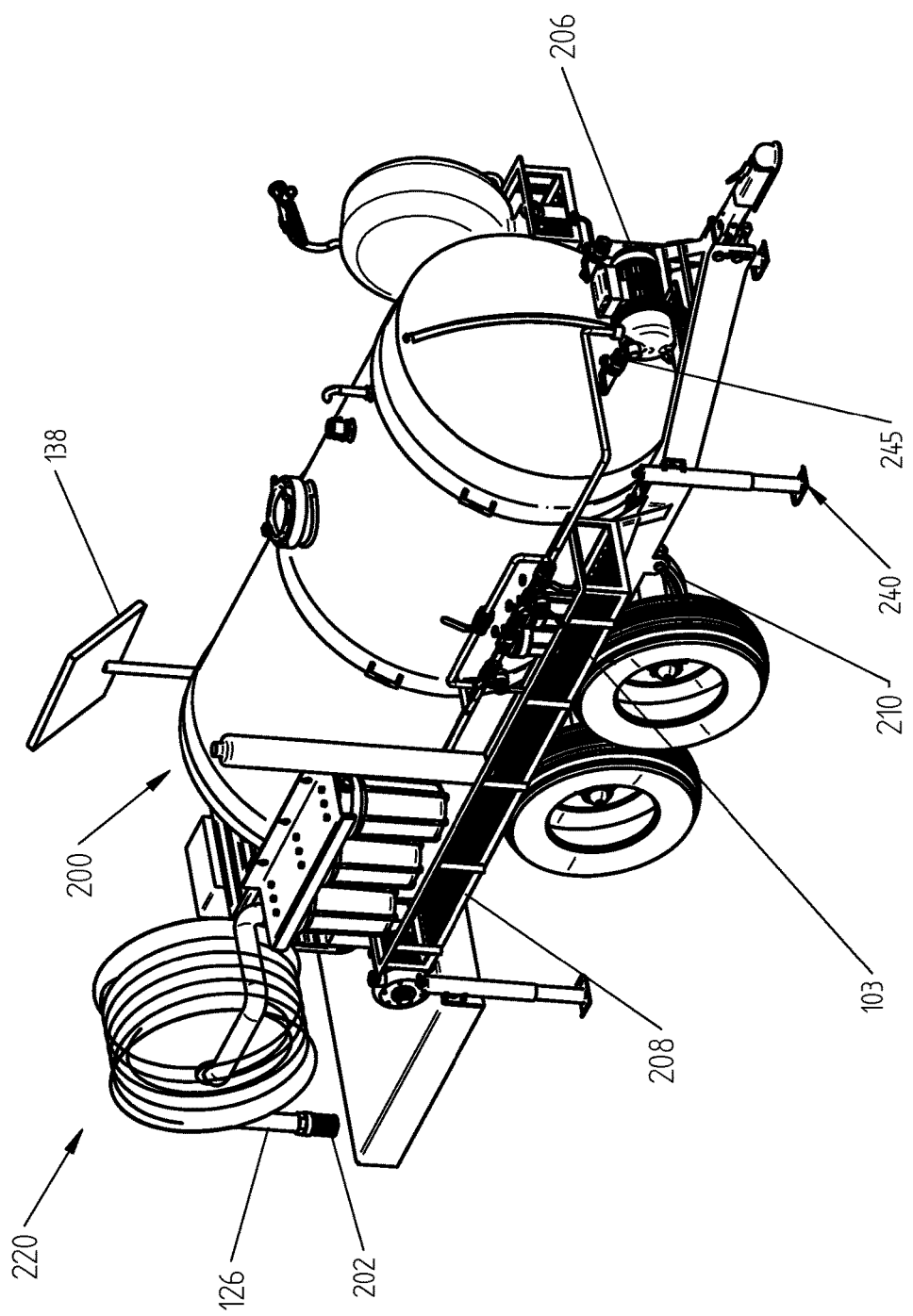

Reference is now made to FIG. 2, which is another simplified pictorial illustration showing another view of a system for water provision 200, in accordance with an embodiment of the present invention. The trailer typically comprises a frame 208 for housing some parts of the system.

The system/apparatus of the present invention is envisaged to be a "plug and play" system, which the rural user, plugs in the delivery nozzle 112 into a tank/receptacle/other filling means and the filtered, purified potable water is provided the system.

Figure 3:
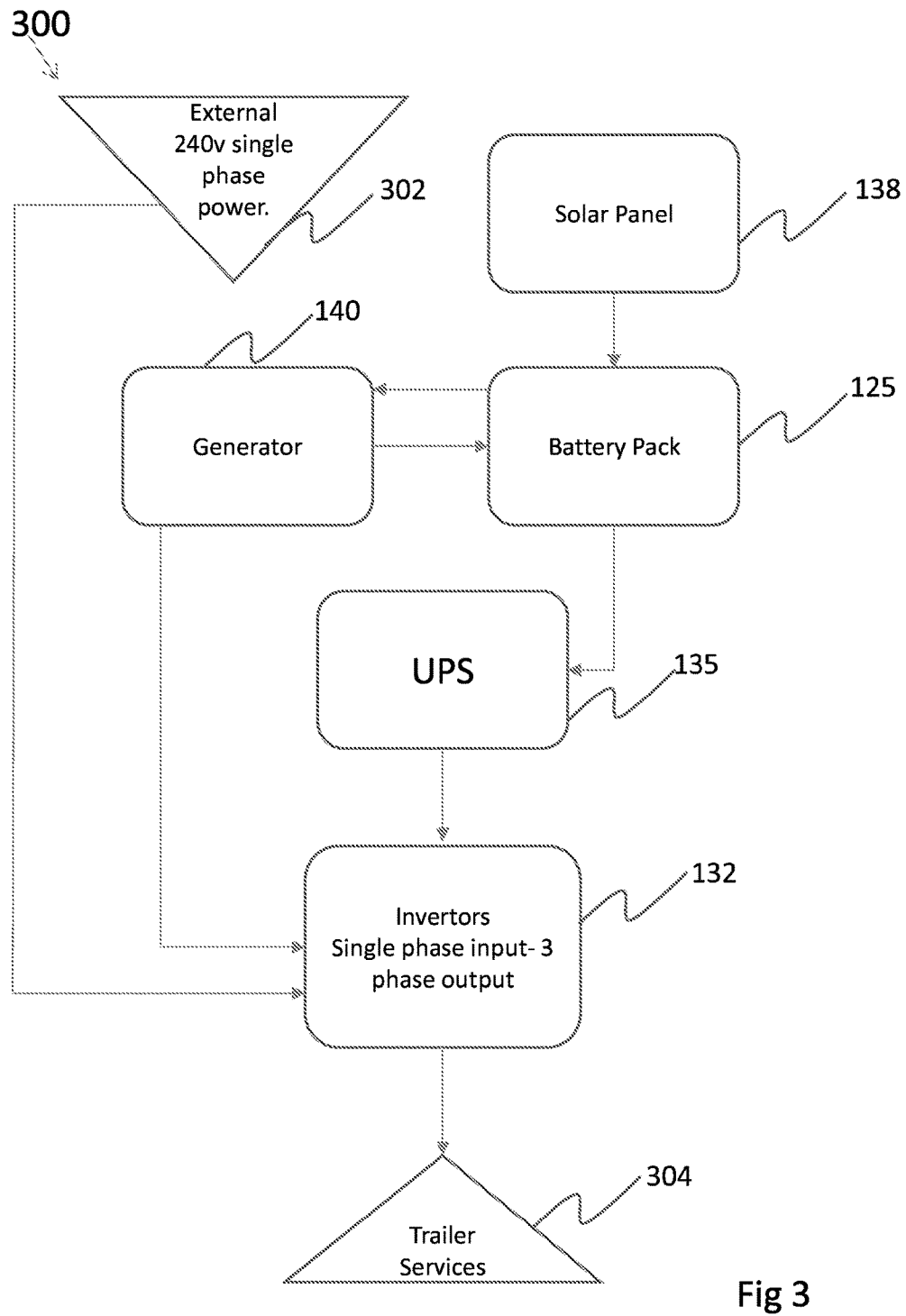

System 100 further comprises a power provision apparatus 300. FIG. 3 shows simplified flow chart of power provision apparatus 300 within the modular system 100 of FIG. 1, in accordance with an embodiment of the present invention.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A transportable modular water provision system for locally providing hundreds of liters of water to at least one residential tent, the system comprising:
    a) a private car or vehicle;
    b) a trailer carrier, adapted to be connected to said private car or vehicle for transport where road infrastructure is lacking, said trailer carrier being less than one meter wide;
    c) a filling apparatus comprising a filling conduit and a filling pump;
    d) a water filter apparatus comprising a micronic and carbon filter system, coupled to an ultraviolet (UV) delivery purifier;
    e) a delivery apparatus comprising a delivery conduit and a delivery pump;
    f) a water container in fluid connection with said filling apparatus and with said delivery apparatus, said delivery apparatus adapted for fluid connection with a water storage container of said residential tent;
    g) a portable electricity generator, an un-interruptible power supply (UPS), and an inverter;
    h) a battery pack; and
    i) a solar panel adapted to charge said battery pack;
    wherein said trailer carrier is adapted to carry said water container and water therein, said filling apparatus, said water filter apparatus, said delivery apparatus, said portable electricity generator, said un-interruptible power supply (UPS) and said inverter, said battery pack and said solar panel; and
    wherein said battery pack is adapted to power up both said UPS and said generator and wherein said generator and said UPS are adapted to provide continuous current to said inverter for continuous function of said filling pump and said delivery pump.

2. A transportable modular water provision system according to claim 1, wherein said trailer carrier, further comprises:
    i. a jack disposed at each corner of said trailer carrier; and
    ii. at least two double-wheeled axes.

3. A transportable modular water provision system according to claim 1, wherein said filling apparatus is in fluid connection with said water filter apparatus and wherein said filling pump is adapted to transfer water from a water reservoir via said delivery conduit through said water filter apparatus to said water container.

4. A transportable modular water provision system according to claim 3, wherein said water container is a generally cylindrical tank.

5. A transportable modular water provision system according to claim 4, wherein said generally cylindrical tank is made of fiberglass.

6. A transportable modular water provision system according to claim 5, wherein said tank further comprises a breather and an inspection window.

7. A transportable modular water provision system according to claim 6, wherein said tank further comprises manual taps in fluid connection therewith.

8. A transportable modular water provision system according to claim 1, wherein said system is adapted to provide filtered water to said at least one residential tent via said filling apparatus.

9. A transportable modular water provision system according to claim 1, wherein at least one of said filling pump and said delivery pump receive electrical energy from said portable electricity generator.

10. A transportable modular water provision system according to claim 9, wherein at least one of said filling pump and said delivery pump receive electrical energy from said inverter, said inverter receiving electrical energy from said portable electricity generator.

11. A transportable modular water provision system according to claim 1, further comprising a cable reel and electrical cable.

12. A transportable modular water provision system according to claim 7, wherein said manual taps are configured to deliver water from the UV filter or bypass the UV filter by adjusting the taps accordingly.

* * * * *